I. H. JARVIS.
LANDSCAPE.
APPLICATION FILED JAN. 17, 1921.

1,395,575.

Patented Nov. 1, 1921.

Inventor
Ida H. Jarvis

UNITED STATES PATENT OFFICE.

IDA HELEN JARVIS, OF BROOKLINE, MASSACHUSETTS.

LANDSCAPE.

1,395,575. Specification of Letters Patent. Patented Nov. 1, 1921.

Application filed January 17, 1921. Serial No. 437,875.

*To all whom it may concern:*

Be it known that I, IDA H. JARVIS, a citizen of the United States, residing at Brookline, in the county of Norfolk and State of Massachusetts, have invented certain new and useful Improvements in Landscapes; and I do declare the following to be a full, clear, and exact description of the invention, such as will enable others skilled in the art to which it appertains to make and use the same.

My invention has for its principal object to provide a landscape formed almost entirely of feathers, such feathers representing natural growth, water, rock, etc.

A further object is to represent foam in a stream of water by means of down.

With the foregoing in view, the invention resides in the device hereinafter described and claimed, and shown by the accompanying drawing.

Figure 1:
Figure 1 is a face view of a landscape formed in accordance with the present invention.
Figure 2:
Fig. 2 is a vertical sectional view as indicated by line 2—2 of Fig. 1.

In carrying out my invention, I employ a suitable mat 1 upon which the sky may be represented by painting or in any other suitable manner as indicated at 2. Upon the mat, I glue, stitch or otherwise secure a plurality of bird feathers in such a manner as to represent any desired work of nature. In the present showing, I have illustrated a water-fall 3, rocks 4 in the stream, foam 5 around the rocks, trees 6 along the water-fall, and vegetable undergrowth 7.

In representing the water-fall 3, I take a length of feather and split the shaft or rachis thereof, so that this part which is designated by the reference character 8, may form the crest of the water-fall, while the barbs and barbules thereof may extend from the shaft in a flowing manner to represent the falling water, as indicated by the reference numeral 9. This representation may be repeated wherever desired and rocks 4 placed at desired intervals, said rocks being represented by other feathers. Wherever the water encounters the rocks, the foam 5 is placed and I preferably form this foam of down.

The trees 6 and undergrowth 7 are represented by using feathers of various sizes, shapes and colors, and the ground may be similarly represented wherever it should appear. By using rather gaudy colors for the foliage and the like along the water-fall, and employing white feathers and down in representing such water-fall, a very pleasing and artistic result is produced and one which, at a distance, cannot easily be distinguished from an elaborate oil painting.

The entire picture when completed is preferably framed in the usual manner, and a glass pane 10 placed thereover to hold the feathers against outward warping away from the mat or the like 1. The pane 10 however does not contact with the feathers to such an extent as to entirely flatten them, since the result is much more life-like if the barbs and barbules of the feathers are allowed to drape and flow in a graceful manner.

It is to be understood that the present disclosure is for illustrative purposes only and that numerous landscapes may be formed in accordance with the invention. Also, I wish it understood that the several features of my invention need not be all incorporated in the same landscape, but that these features may be used either collectively or individually as found desirable.

I claim:

1. A device of the class described comprising a backing board, a plurality of relatively large feathers secured against said backing board to represent a number of trees, and comparatively small feathers secured against said board to simulate undergrowth beneath the trees.

2. A device of the class described comprising a backing board, feathers arranged on said backing board to represent a stream, and other feathers arranged on said board to represent natural growth along the stream.

3. A scene having a stream of water represented by flowing barbs of feathers running longitudinally of the stream.

4. A scene embodying a stream of water and foam in said stream represented by down.

5. A scene having a water-fall represented by a length of feather split longitudinally with the shaft of the feather representing the crest of the water-fall and the barbs representing the falling water.

6. A scene having a stream of water represented by feathers and foam in the stream represented by down.

7. A scene having a stream represented by feathers, rocks in the stream also represented by feathers, and foam around the rocks represented by down.

8. A scene having a water-fall represented by flowing feather barbs, rocks in the water-fall represented by feathers, foam around the rocks represented by down, and natural growth along the falls represented by feathers.

In testimony whereof I have hereunto set my hand.

IDA HELEN JARVIS.